(12) United States Patent
Hiramoto

(10) Patent No.: US 10,777,798 B2
(45) Date of Patent: Sep. 15, 2020

(54) NONAQUEOUS SECONDARY BATTERY

(71) Applicant: Toyota Jidosha Kabushiki Kaisha, Toyota-shi Aichi-ken (JP)

(72) Inventor: Natsumi Hiramoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 101 days.

(21) Appl. No.: 16/180,600

(22) Filed: Nov. 5, 2018

(65) Prior Publication Data

US 2019/0140238 A1  May 9, 2019

(30) Foreign Application Priority Data

Nov. 7, 2017 (JP) .................................. 2017-215088

(51) Int. Cl.
*H01M 2/16* (2006.01)
*H01M 2/18* (2006.01)
*H01M 10/052* (2010.01)
*H01M 4/02* (2006.01)

(52) U.S. Cl.
CPC .......... *H01M 2/168* (2013.01); *H01M 2/1673* (2013.01); *H01M 2/18* (2013.01); *H01M 10/052* (2013.01); *H01M 2004/021* (2013.01); *H01M 2220/20* (2013.01)

(58) Field of Classification Search
CPC ....... H01M 2/168; H01M 2/1673; H01M 2/18
See application file for complete search history.

(56) References Cited

U.S. PATENT DOCUMENTS

| 2011/0003210 A1 | 1/2011 | Lim et al. | |
|---|---|---|---|
| 2013/0316219 A1* | 11/2013 | Ha ........................ | H01M 2/145 429/144 |
| 2015/0162584 A1* | 6/2015 | Uematsu ............... | H01M 4/485 429/163 |

FOREIGN PATENT DOCUMENTS

| JP | 2003297680 A | 10/2003 |
|---|---|---|
| JP | 2011012238 A | 1/2011 |
| JP | 2014534570 A | 12/2014 |

* cited by examiner

*Primary Examiner* — Jayne L Mershon
(74) *Attorney, Agent, or Firm* — Dinsmore & Shohl LLP

(57) ABSTRACT

According to the present disclosure, the nonaqueous secondary battery includes: an electrode body including a positive electrode, a negative electrode, and a separator; and a nonaqueous electrolyte. At least one electrode of the positive electrode and the negative electrode and the separator satisfy any of conditions below: (1) the electrode and the separator are in contact with each other; (2) the separator has an O/C ratio of 0.1 or more and 0.2 or less; (3) the separator has a surface roughness Ra of 0.05 μm or more and 0.3 μm or less; and (4) a ratio of the surface roughness Ra of the separator to the surface roughness Ra of the electrode is 0.1 or more and 0.5 or less.

7 Claims, 4 Drawing Sheets

NONAQUEOUS SECONDARY BATTERY

CROSS REFERENCE TO RELATED APPLICATIONS

This application claims the benefit of priority to Japanese Patent Application No. 2017-215088 filed on Nov. 7, 2017. The entire contents of this application are hereby incorporated herein by reference.

BACKGROUND OF THE DISCLOSURE

1. Field

The present disclosure relates to a nonaqueous secondary battery.

2. Background

A typical nonaqueous secondary battery has an electrode body as a power generating element, a nonaqueous electrolyte, and a battery case for accommodation thereof. Typically, the electrode body is configured such that a pair of electrodes (that is, a positive electrode and a negative electrode) are opposed to each other with a porous insulating member (separator) interposed therebetween. In relation to this, for example, the Japanese Translation of PCT Application No. 2014-534570 discloses a nonaqueous secondary battery in which an adhesive layer is formed on the surface of a separator. In the Japanese Translation of PCT Application No. 2014-534570, the electrode and the separator are bonded to each other with the adhesive layer interposed therebetween, thereby improving the handleability of the electrode body at the time of assembling the battery.

SUMMARY

However, in the above technique, after the battery is assembled, the adhesive layer is interposed between the electrode and the separator. The resulting problem is that the charge carriers are less likely to move between the positive and negative electrodes at the time of charging and discharging, or insertion and detachment of the charge carriers are hindered at the surfaces of the positive and negative electrodes, thereby increasing the internal resistance. In particular, in batteries used in a mode in which high-rate charging and discharging at 2 C or more is repeated, the influence of such an increase in internal resistance is clearly demonstrated. Therefore, it is required to reduce the internal resistance while maintaining the adhesiveness between the electrodes and the separator.

The present disclosure has been accomplished in view of such circumstances, and an object thereof is to provide a nonaqueous secondary battery in which the internal resistance is reduced while maintaining the adhesiveness between electrodes and a separator.

According to the present disclosure, there is provided a nonaqueous secondary battery comprising an electrode body including a positive electrode, a negative electrode, and a separator interposed between the positive electrode and the negative electrode, and a nonaqueous electrolyte. At least one electrode of the positive electrode and the negative electrode and the separator satisfy any of conditions (1) to (4) below: (1) the electrode and the separator are in contact with each other; (2) a surface of the separator on the side facing the electrode has an O/C ratio of 0.1 or more and 0.2 or less, which is calculated by the following formula: O/C ratio=area of O1s peak measured by X-ray photoelectron spectroscopy/area C1s peak measured by X-ray photoelectron spectroscopy; (3) a surface roughness Ra of the surface of the separator on the side facing the electrode is 0.05 μm or more and 0.3 μm or less; and (4) a ratio of the surface roughness Ra of the separator to the surface roughness Ra of the electrode is 0.1 or more and 0.5 or less.

In some embodiments, the O/C ratio of the surface of the separator is adjusted to a predetermined range and the surface roughness Ra of the electrode and the surface roughness Ra of the separator are matched. This makes it possible to integrate the electrode and the separator without interposing therebetween a high-resistance layer such as the adhesive layer. As a result, it is possible to improve the mobility of charge carriers inside the electrode body while maintaining the adhesiveness between the electrode and the separator. Therefore, the internal resistance can be reduced as compared with a battery the adhesive layer.

Incidentally, Japanese Patent Application Publications No. 2003-297680 and No. 2011-012238 disclose separators that have been surface-modified for the purpose of improving affinity for a nonaqueous electrolytic solution. However, these patent literatures neither disclose nor suggest the surface roughness of the electrode and/or the separator. Further, as is clear from the test examples described hereinbelow, in the techniques disclosed in Japanese Patent Application Publications No. 2003-297680 and No. 2011-012238, the surface roughness Ra of the separator becomes too large and the effect of bonding the electrode and the separator cannot be obtained.

In some embodiments of the nonaqueous secondary battery disclosed herein, the electrode has the surface roughness Ra of the surface on the side facing the separator of 0.1 μm or more and 0.7 μm or less. By setting the surface roughness Ra within the above range, it is possible to increase the anchoring force on the separator and increase the contact area with the separator. Therefore, the adhesive force with the separator can be further improved.

In some embodiments of the nonaqueous secondary battery disclosed herein, the positive electrode and the separator satisfy all of the conditions (1) to (4), and the negative electrode and the separator satisfy all of the conditions (1) to (4). This makes it possible to improve the integrity of the electrode body and to further improve the handleability of the electrode body at the time of assembling the battery. Further, the distance between the positive and negative electrodes can be decreased, and the internal resistance can be further reduced. Therefore, the effect of the technique disclosed herein can be exerted at a higher level.

In some embodiments of the nonaqueous secondary battery disclosed herein, the electrode body is a laminated electrode body configured by alternately and repeatedly laminating a plurality of the positive electrodes of a rectangular shape and a plurality of the negative electrodes of a rectangular shape with a plurality of the separators of a rectangular shape interposed therebetween. In the electrode body having such a configuration, the positional relationship between the positive electrode, the negative electrode, and the separator is likely to shift at the time of assembling the battery. Therefore, the technique disclosed herein can be used effectively.

In some embodiments of the nonaqueous secondary battery disclosed herein, a 90° peel strength between the electrode and the separator is 0.6 N/m or more. This makes it possible to improve the handleability of the electrode body at the time of assembling the battery, and to increase the productivity. Further, uniform distance between the positive and negative electrodes can be maintained during charging and discharging and the internal resistance can be kept low, for example, after repeated high-rate charging and discharging.

The above and other elements, features, steps, characteristics and advantages of the present disclosure will become more apparent from the following detailed description of the embodiments with reference to the attached drawings.

DESCRIPTION OF THE EMBODIMENTS

Figure 1:
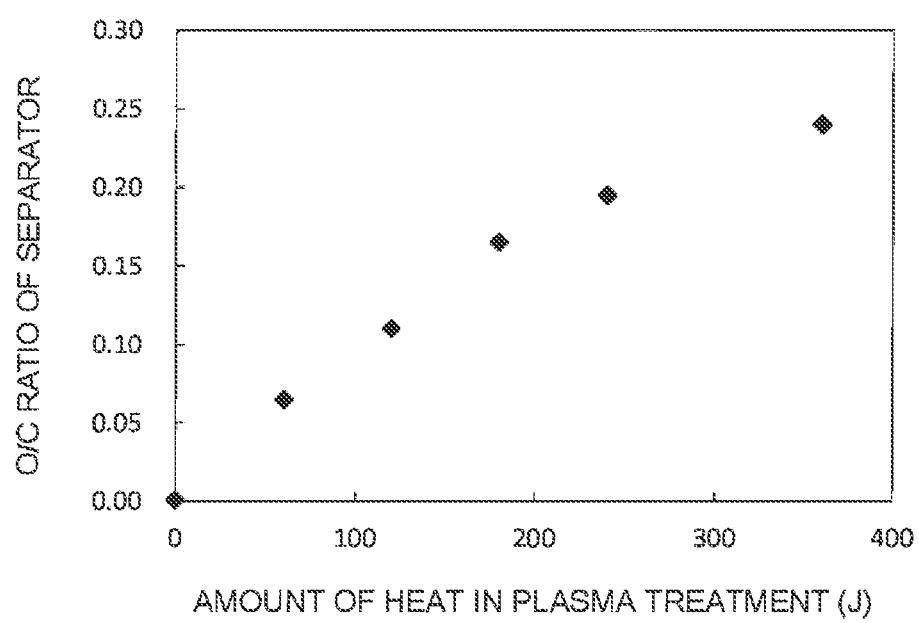
FIG. 1 is a graph showing the relationship between the amount of heat of plasma treatment and the O/C ratio of the separator.

Embodiments of the present disclosure will be described below. Incidentally, matters other than those particularly mentioned in the present specification (for example, constituent elements and a general battery construction process which do not characterize the present disclosure) can be grasped as design matters by a person skilled in the art on the basis of the related art in the pertinent field. The present disclosure can be implemented based on the contents disclosed in this specification and technical knowledge in the field. Further, in the present specification, when numerical ranges are represented as A to B (where A and B are arbitrary numerical values), it means A or more and B or less.

The nonaqueous secondary battery disclosed herein has an electrode body as a power generating element and a nonaqueous electrolyte. The electrode body and the nonaqueous electrolyte are typically housed in a battery case. The shape, material size, and the like of the battery case are not particularly limited. Any battery case can be used as long as the battery case can house the electrode body and the nonaqueous electrolyte therein.

The nonaqueous electrolyte may be the same as in the related art and is not particularly limited. In some embodiments, the nonaqueous electrolyte includes a supporting salt and a nonaqueous solvent. In some embodiments, the nonaqueous electrolyte is a nonaqueous electrolytic solution that is in a liquid state at room temperature (25° C.). In some embodiments, the nonaqueous electrolyte is in a liquid state within a usage temperature range of a nonaqueous secondary battery (for example, in the range of −10° C. to +50° C.). The supporting salt dissociates in a nonaqueous solvent to produce charge carriers. The supporting salt can be exemplified by a lithium salt, a sodium salt, a magnesium salt and the like. In some embodiments, the supporting salt is a fluorine-containing lithium salt such as $LiPF_6$ and $LiBF_4$. In some embodiments, the concentration of the supporting salt in the nonaqueous electrolyte is, for example, 0.7 mol/L to 1.3 mol/L.

The nonaqueous solvent can be exemplified by aprotic solvents such as carbonates, esters, ethers, nitriles, sulfones, and lactones. In some embodiments, the nonaqueous solvent may be carbonates, for example, cyclic carbonates such as ethylene carbonate (EC), propylene carbonate (PC) and monofluoroethylene carbonate (FEC), and linear carbonates such as dimethyl carbonate (DMC), ethyl methyl carbonate (EMC), and methyl-2,2,2-trifluoroethyl carbonate (MT-FEC). In addition to the supporting salt and the nonaqueous solvent, the nonaqueous electrolyte may further include optional components. Examples of optional components include a film forming agent such as lithium bis(oxalato) borate (LiBOB) and vinylene carbonate (VC), and a gas generating agent such as biphenyl (BP) and cyclohexylbenzene (CHB). The gas generating agent has a function of generating gas when the battery is overcharged.

The electrode body has a pair of electrodes (that is, a positive electrode and a negative electrode) and a separator interposed between the positive electrode and the negative electrode. The outer shape of the electrode body is not particularly limited and may be, for example, a rectangular shape, a cylindrical shape, a flat shape or the like. In some embodiments, the electrode body is a laminated electrode body configured by laminating a rectangular positive electrode and a rectangular negative electrode with a rectangular separator interposed therebetween. In some embodiments, the laminated electrode body has a plurality of positive electrodes, a plurality of negative electrode, and a plurality of separators. For example, in some embodiments, the laminated electrode body is configured by alternately and repeatedly laminating a plurality of positive electrodes and a plurality of negative electrodes with a plurality of separators interposed therebetween. In the laminated electrode body having such a configuration, the positional relationship between the positive electrode, the negative electrode, and the separator is likely to shift at the time of assembling the battery. Therefore, the technique disclosed herein can be used effectively. However, the electrode body may be a wound electrode body in which a strip-shaped positive electrode and a strip-like negative electrode are stacked in a state where a strip-shaped separator is interposed therebetween and the stack is wound in a longitudinal direction. According to the technique disclosed herein, occurrence of so-called winding misalignment when winding a wound electrode body can be suitably suppressed.

In some embodiments, the positive electrode includes a positive electrode current collector and a positive electrode active material layer of a porous structure fixedly attached to the positive electrode current collector. The positive electrode current collector can be exemplified by a metal sheet having good conductivity, for example, a metal foil such as an aluminum foil. The positive electrode active material layer includes at least a positive electrode active material. In some embodiments, the positive electrode is prepared by coating a positive electrode paste prepared by kneading a positive electrode active material or the like in an appropriate solvent on the surface of a positive electrode current collector, followed by drying and pressing.

In some embodiments, the positive electrode active material is a material capable of reversibly occluding and releasing charge carriers (for example, lithium ions). Examples of the positive electrode active material include, but are not limited to, lithium transition metal composite oxides such as a lithium nickel composite oxide, a lithium cobalt composite oxide, a lithium nickel cobalt composite oxide, a lithium manganese composite oxide, a lithium nickel cobalt manganese composite oxide, and the like. In some embodiments, the positive electrode active material is of a particulate shape. Although not subject to any particular limitation, the average particle diameter of the positive electrode active material (50 volume % particle diameter (D50) based on a laser diffraction/light scattering method; the same applies hereinafter) is about 20 μm or less, in some embodiments 1 μm to 10 μm, and in some other embodiments about 3 μm to 7 μm.

In addition to the above-described positive electrode active material, the positive electrode active material layer may further include optional components. The optional components can be exemplified by a conductive material, a binder, a dispersing agent and the like. In some embodiments, the conductive material comprises carbon materials, for example, carbon black, such as acetylene black and ketjen black. In some embodiments, the binder comprises halogenated vinyl resins such as polyvinylidene fluoride (PVdF) and/or polyalkylene oxides such as polyethylene oxide (PEO).

The positive electrode active material layer may be disposed so as to be in contact with the separator. Furthermore, in some embodiments the positive electrode active material layer may be adhesively bonded to the separator. In other words, in some embodiments the 90° peel strength is 0.5 N/m or more. The distance between the positive and negative electrodes can thus be shortened, and the internal resistance can be reduced. As a result, it is possible to exhibit more excellent battery characteristics, for example, high input/output characteristics.

In some embodiments, from the viewpoint of balance with the surface roughness Ra of the separator, the surface roughness Ra of the positive electrode active material layer facing the separator may be 0.1 μm to 0.7 μm. This makes it possible to better satisfy the Ra ratio range described hereinbelow. Further, by setting the surface roughness Ra to a predetermined value or more, it is possible to increase the anchoring force on the separator and to improve the adhesive force with the separator. By setting the surface roughness Ra to a predetermined value or less, it is possible to increase the contact area with the separator and to improve the adhesive force with the separator. From the above viewpoint, in some embodiments, the surface roughness Ra of the positive electrode active material layer may be about 0.5 μm or more, in some other embodiments, 0.22 μm or more, and in some embodiments, about 0.5 μm or less, in some other embodiments, 0.37 μm or less. The surface roughness Ra of the positive electrode active material layer can be adjusted by a variety of methods, for example, by changing the average particle diameter and particle diameter distribution of the positive electrode active material, the solid content ratio of the positive electrode paste, the pressure during pressing, and the like.

The negative electrode typically includes a negative electrode current collector and a negative electrode active material layer of a porous structure fixedly attached to the negative electrode current collector. The negative electrode current collector can be exemplified by a metal sheet having good conductivity, for example, a metal foil such as a copper foil. The negative electrode active material layer includes at least a negative electrode active material. The negative electrode is prepared, in some embodiments, by coating a negative electrode paste prepared by kneading a negative electrode active material or the like in an appropriate solvent on the surface of a negative electrode current collector, followed by drying and pressing.

In some embodiments, the negative electrode active material is a material capable of reversibly occluding and releasing charge carriers (for example, lithium ions). Examples of the negative electrode active material include, but are not limited to, carbon materials, such as graphite-based carbon materials such as natural graphite, artificial graphite, amorphous coated graphite or the like. In the present specification, the term "graphite-based carbon material" refers to a material in which the proportion of graphite is approximately 50% by mass or more, and in some embodiments 80% by mass or more, of the entire carbon material. In some embodiments, the negative electrode active material is of a particulate shape. Although not subject to any particular limitation, the average particle diameter of the negative electrode active material is about 50 μm or less in some embodiments, in some embodiments 1 μm to 30 μm, and in some other embodiments about 5 μm to 25 μm.

In addition to the above-described negative electrode active material, the negative electrode active material layer may further include optional components. The optional components can be exemplified by a binder, a thickener, a dispersing agent and the like. In some embodiments, the binder comprises rubbers such as styrene butadiene rubber (SBR). In some embodiments, the thickener comprises a cellulose such as carboxymethylcellulose (CMC) and methylcellulose (MC).

The negative electrode active material layer may be disposed so as to be in contact with the separator. Furthermore, in some embodiments the negative electrode active material layer may be adhesively bonded to the separator. In other words, in some embodiments the 90° peel strength is 0.5 N/m or more. The distance between the positive and negative electrodes can thus be shortened, and the internal resistance can be reduced. As a result, it is possible to exhibit more excellent battery characteristics, for example, high input/output characteristics.

In some embodiments, from the viewpoint of the balance with the surface roughness Ra of the separator, the surface roughness Ra of the negative electrode active material layer facing the separator is 0.1 μm to 0.7 μm. This makes it possible to better satisfy the Ra ratio range described hereinbelow. Further, by setting the surface roughness Ra to a predetermined value or more, it is possible to increase the anchoring force on the separator and to improve the adhesive force with the separator. By setting the surface roughness Ra to a predetermined value or less, it is possible to increase the contact area with the separator and to improve the adhesive force with the separator. From the above viewpoints, in some embodiments, the surface roughness Ra of the negative electrode active material layer may be about 0.15 μm or more, in some other embodiments, 0.22 μm or more, and in some embodiments about 0.69 μm or less, in some other embodiments, 0.5 μm or less. The surface roughness Ra of the negative electrode active material layer can be adjusted by a variety of methods, for example, by changing the average particle diameter and particle diameter distribution of the negative electrode active material, the solid content ratio of the negative electrode paste, the pressure during pressing, and the like.

The separator is disposed between the positive electrode and the negative electrode. More specifically, the separator is disposed between the positive electrode active material layer of the positive electrode and the negative electrode active material layer of the negative electrode. The separator insulates the positive electrode and the negative electrode from each other. The separator is configured to be porous so that charge carriers contained in the nonaqueous electrolyte can pass therethrough. The separator holds the nonaqueous electrolyte in the pores and forms an ionic conduction path between the positive electrode active material layer and the negative electrode active material layer. Although the air permeability of the separator (Gurley value; the value measured according to JIS P 8117:2009; the same applies hereinbelow) is not particularly limited, in some embodiments it is about 300 sec/100 ml or less, in some other embodiments 100 sec/100 ml to 250 sec/100 ml, and in some other embodiments 150 sec/100 ml to 200 sec/100 ml. As a result, the movement of charge carriers in the separator becomes smooth, and even in a mode in which, for example, high-rate charging and discharging are repeated, an increase in internal resistance can be suitably suppressed.

In some embodiments, the separator has a resin base material. Examples of the resin base material include, but are not limited to, porous resin sheets (films) composed of a polyolefin resin such as polyethylene (PE) and polypropylene (PP), a polyvinyl chloride resin, a polyvinyl acetate resin, a polyimide resin, a polyamide resin, cellulose or the like. The resin base material may have a single layer structure or a multilayer structure in which two or more kinds of porous resin sheets composed of different materials and having different properties (thickness, air permeability, and the like) are stacked. Although the thickness of the resin base material is not particularly limited, in some embodiments it may be about 5 μm or more, in some other embodiments, 10 μm or more, and in some embodiments it may be about 50 μm or less, in some other embodiments 30 μm or less, and in some other embodiments, 25 μm or less. The separator may have a heat resistant layer (HRL layer) including inorganic compound particles (inorganic filler) such as alumina on the surface of the resin base material. In some embodiments, the separator does not have a layer that inhibits the movement of charge carriers on the surface of the resin base material, for example, an adhesive layer as described in Japanese Translation of PCT Application No. 2014-534570.

In some embodiments, at least one surface (in some embodiments, both surfaces) of the separator is modified to have a hydrophilic group (oxygen-containing functional group). Further, in some embodiments the O/C ratio of at least one surface (in some embodiments, both surfaces) of the separator is 0.1 to 0.2. By setting the O/C ratio within the above range, it is possible to increase the anchoring force on the electrode and enhance the adhesion to the electrode. From the above viewpoint, in some embodiments the O/C ratio may be about 0.11 or more, in some other embodiments, 0.15 or more, and in some embodiments about 0.195 or less, in some other embodiments, 0.19 or less. The O/C ratio of the separator can be adjusted by a variety of surface treatment methods. For example, the adjustment can be made by plasma treatment, corona discharge treatment, UV treatment, acid treatment, alkali treatment or the like. In a test example described later, a method for surface modification by plasma treatment is used.

In some embodiments, from the viewpoint of the balance with the surface roughness Ra of the electrode, the surface roughness Ra of at least one surface of the separator is 0.05 μm to 0.3 μm. This makes it possible to better satisfy the Ra ratio range described hereinbelow. Further, by setting the surface roughness Ra to a predetermined value or more, it is possible to increase the anchoring force on the electrode and to improve the adhesive force with the electrode. Further, by setting the surface roughness Ra to a predetermined value or less, it is possible to increase the contact area with the electrode and to improve the adhesive force with the electrode. From the above viewpoint, in some embodiments the surface roughness Ra of the at least one surface of the separator may be about 0.055 μm or more, in some other embodiments, 0.065 μm or more, and in some embodiments about 0.28 μm or less, in some other embodiments, 0.21 μm or less. When the electrode body is a laminated electrode body, both surfaces of the separator, in other words, the surface facing the positive electrode and the surface facing the negative electrode are may have the surface roughness Ra within the above range.

In some embodiments, the ratio (Ra ratio) of the surface roughness Ra of the separator to the surface roughness Ra of the electrode (positive electrode and/or negative electrode) is 0.1 to 0.5. As a result, the adhesiveness between the electrode and the separator can be enhanced. From the above viewpoint, in some embodiments the Ra ratio may be about 0.15 or more, in some other embodiments, 0.2 or more, and in some embodiments the Ra ratio may be about 0.42 or less, in some other embodiments, 0.3 or less. As a result, the effect of the technique disclosed herein can be exerted more satisfactorily, and the adhesiveness between the electrode and the separator can be further increased.

In some embodiments, the separator is bonded to at least one of the positive electrode and the negative electrode and is physically integrated therewith. In other words, the peel strength between the electrode and the separator (90° peel strength measured in accordance with JIS K 6854-1:1999) is 0.5 N/m or more. From the viewpoint of better demonstrating the effect of the technique disclosed herein, for example, maintaining the adhesion state suitably even after repeating high-rate charging and discharging, the peel strength may be 0.6 N/m or more, for example, 0.7 N/m or more. The upper limit of the peel strength is not particularly limited, but it may be about 2 N/m or less, for example, 1 N/m or less.

As described above, in some embodiments, at least one electrode of the positive electrode and the negative electrode and the separator satisfy all of the following conditions (1) to (4); (1) the electrode and the separator are in contact with each other; (2) the surface of the separator on the side facing the electrode has an O/C ratio of 0.1 to 0.2; (3) the surface roughness Ra of the surface of the separator on the side facing the electrode is 0.05 μm to 0.3 μm; and (4) the ratio of the surface roughness Ra of the separator to the surface roughness Ra of the electrode is 0.1 or more and 0.5 or less.

By satisfying all of the above (1) to (4), it is possible to reduce the internal resistance while maintaining to adhesiveness between the electrode and the separator. Thus, where (2) is satisfied, the wettability with respect to the nonaqueous electrolyte is enhanced and adhesion to the electrode is facilitated. Where (3) and (4) are satisfied at the same time, the electrode and the separator are physically or chemically joined and physically integrated. Therefore, according to the technique disclosed herein, it is possible to join the electrode and the separator without interposing a high-resistance layer such as the above-mentioned adhesive layer. As a result, with the technique disclosed herein, the mobility of charge carriers inside the electrode body can be improved. Therefore, the internal resistance can be reduced and the battery performance can be improved.

Although the nonaqueous secondary battery disclosed herein can be used for various purposes, since the battery has such a configuration as described above, the battery has lower internal resistance than the conventional products and has excellent input/output characteristics and high-rate cycle characteristic. Because of such properties, the nonaqueous secondary battery disclosed herein can be used in applications where high-rate charging and discharging at a rate of 2 C or more, for example, 5 C or more, is repeatedly performed. Such applications include, for example, a power source (driving power source) for a motor mounted on a vehicle. Types of vehicles are not particularly limited, but in some embodiments include automobiles such as plug-in hybrid vehicles (PHV), hybrid vehicles (HV), electric vehicles (EV), and the like. In some embodiments, the nonaqueous secondary battery disclosed herein is used in the form of a battery pack in which a plurality of the batteries are connected in series and/or in parallel.

Several examples relating to the present disclosure will be described below, but the disclosure is not intended to be limited to these specific examples.

Investigation I-1. Investigation of Separator

Plasma Treatment: First, a plurality of commercially available separators made of polypropylene (PP) (single-layer structure, thickness 20 μm) are prepared, and one of them was set as Comparative Example 1. Next, a plurality of separators, except for Comparative Example 1, were subjected to surface treatment applied by using an atmospheric pressure plasma treatment apparatus. Specifically, plasma treatment was performed on both surfaces of each separator under conditions of an output of 4 kW, a gas flow rate of 50 L/min ($N_2$ gas), and a conveying speed of 10 m/min under a room temperature (25° C.) environment. At this time, the amount of heat applied per unit area of each separator was varied between 60 J and 360 J as shown in Table 1. In this way, separators of Examples 1 to 3 and Comparative Examples 2 and 3 were obtained.

Measurement of O/C Ratio: The O/C ratio was measured for the surface of each of the separator (Comparative Example 1) not subjected to the surface treatment and the separators (Examples 1 to 3 and Comparative Examples 2 and 3) subjected to the surface treatment as described above. Specifically, first, the XPS spectrum of the surface of each separator was measured by X-ray photoelectron spectroscopy. In the XPS spectrum, the horizontal axis represents binding energy (eV) and the vertical axis represents intensity (arbitrary unit, a.u.). Next, the peak area of the peak O1s derived from the energy of the 1s electron orbital of an oxygen (O) atom and the peak area of the peak C1s derived from the energy of the 1s electron orbital of carbon (C) were determined from the XPS spectrum. Then, the ratio (O/C ratio) of the peak area of O1s to the peak area of C1s was calculated according to the relative sensitivity factor method. The results are shown in Table 1. Incidentally, the O/C ratio is a value serving as an index indicating the magnitude of the oxygen-containing functional groups. The O/C ratio indicates that the larger the value, the higher the hydrophilicity of the surface of the separator, and the better the affinity for the nonaqueous electrolyte.

Measurement of Surface Roughness Ra: The surface roughness Ra was measured for the surface of each of the separator (Comparative Example 1) not subjected to the surface treatment and the separators (Examples 1 to 3 and Comparative Examples 2 and 3) subjected to the surface treatment as described above. Specifically, first, a probe was scanned on the surface of each separator in the atmosphere by using an atomic force microscope. The scanning speed of the probe was 0.1 Hz. Then, the arithmetic mean value of the surface roughness in the measurement range was calculated as the surface roughness Ra. The results are shown in Table 1.

Measurement of Air Permeability: The air permeability was measured for the surface of each of the separator (Comparative Example 1) not subjected to the surface treatment and the separators (Examples 1 to 3 and Comparative Examples 2 and 3) subjected to the surface treatment as described above. Specifically, first, each separator was cut out into a disk shape having a diameter of 12 mm to prepare a test piece. This test piece was placed in a Gurley testing machine (type A) and air pressure was applied in accordance with JIS P 8117:2009. Then, the time (sec) required for 100 ml of air to permeate through the test piece was measured. The results are shown in Table 1.

TABLE 1

| | Separator | | | | |
|---|---|---|---|---|---|
| | Plasma treatment | | | | |
| | Yes/No | Amount of heat (J) | O/C ratio | Ra (μm) | Air permeability (sec/100 ml) |
| Example 1 | Yes | 180 | 0.165 | 0.055 | 194 |
| Example 2 | Yes | 120 | 0.110 | 0.055 | 192 |
| Example 3 | Yes | 240 | 0.195 | 0.055 | 193 |
| Comparative Example 1 | No | 0 | 0.001 | 0.055 | 190 |
| Comparative Example 2 | Yes | 60 | 0.065 | 0.055 | 191 |
| Comparative Example 3 | Yes | 360 | 0.240 | 0.28 | 220 |

FIG. 1 is a graph showing the relationship between the amount of heat of the plasma treatment and the O/C ratio of the separator. As shown in Table 1 and FIG. 1, it was possible to change the O/C ratio of the separator by changing the amount of heat of the plasma treatment. Also, as shown in Comparative Example 3, when the amount of heat of the plasma treatment reached a predetermined value or more, the surface roughness Ra and air permeability of the separator remarkably increased. Although the reason for this is not clear, it is conceivable that the separator itself was somewhat damaged and the surface of the separator has deteriorated.

Investigation I-2. Evaluation of Adhesive Properties and Internal Resistance

Construction of Electrode Body: First, $LiNi_{1/3}Co_{1/3}Mn_{1/3}O_2$ (NCM, average particle diameter 5.3 μm in Example 1) as a positive electrode active material, polyvinylidene fluoride (PVdf) as a binder, and acetylene black (AB) as a conductive material were mixed in N-methyl-2-pyrrolidone (NMP) to prepare a positive electrode paste (solid fraction: 60%). The positive electrode paste was coated on an aluminum foil, dried, and pressed to a predetermined thickness to prepare a positive electrode having a positive electrode active material layer. At this time, positive electrodes having a surface roughness Ra of 0.05 to 0.36 were prepared, as shown in Table 2, by changing the average particle diameter of the positive electrode active material within the range of 3 μm to 10 μm. The ratio of the surface roughness of the separator to the surface roughness Ra of the positive electrode was calculated as a Ra ratio and is shown in Table 2.

Next, natural graphite (C, average particle diameter 22 μm in Example 1) as a negative electrode active material, styrene butadiene rubber (SBR) as a binder, and carboxymethyl cellulose (CMC) as a thickener were mixed with each other in water to prepare a negative electrode paste (solid fraction: 65%). The negative electrode paste was coated on a copper foil, dried, and pressed to a predetermined thickness to prepare a negative electrode having a negative electrode active material layer. At this time, negative electrodes having a surface roughness Ra of 0.22 to 0.69 were prepared, as shown in Table 2, by changing the average particle diameter of the negative electrode active material within the range of 10 μm to 35 μm. The ratio of the surface roughness of the separator to the surface roughness Ra of the negative electrode was calculated as a Ra ratio and is shown in Table 2.

Next, the separators (Examples 1 to 3 and Comparative Examples 1 to 3) were prepared. A separator (Comparative Example 4) in which an adhesive layer (thickness: 2 μm, surface roughness Ra: 0.4 μm) was formed on both surfaces of a separator was prepared according to Japanese Translation of PCT Application No. 2014-534570. The positive electrodes and the negative electrodes were then laminated with the respective separators interposed therebetween and the laminates were roll-pressed at a linear pressure of 8 kg/cm in a room temperature (25° C.) environment, whereby laminated electrode bodies (Examples 1 to 3 and Comparative Examples 1 to 4) were prepared.

Evaluation of Adhesiveness: With respect to the laminated electrode bodies, the adhesiveness between the positive electrode and the separator and between the negative electrode and the separator was evaluated. Specifically, first, according to JIS K 6854-1:1999, the separator side of the prepared laminated electrode body was fixed to a fixing jig with a double-sided tape. Next, the positive electrode side or the negative electrode side was pulled in the vertical direction (at an angle of 90°) with an autograph. Then, a graph was plotted with the tensile distance against the abscissa and the tensile strength against the ordinate, and the maximum value of the tensile strength was taken as the peel strength. The results are shown in Table 2.

where plasma treatment is used as the surface treatment method of the separator, a satisfactory amount of heat applied per unit area of the separator of about 100 J to 300 J, for example, 120 J to 250 J is obtained. In Comparative Example 4 in which an adhesive layer was present on the surface of the separator, satisfactory adhesiveness was also demonstrated.

Construction of Nonaqueous Secondary Battery, Initial Charging: First, $LiPF_6$ as a supporting salt was dissolved at a concentration of 1.0 M in a mixed solvent including ethylene carbonate (EC), dimethyl carbonate (DMC) and ethyl methyl carbonate (EMC) at an EC:DMC:EMC volume ratios of 1:1:1 to prepare a nonaqueous electrolytic solution. The prepared laminated electrode was then sealed together with the nonaqueous electrolytic solution in a battery case. As a result, a battery assembly was constructed. Next, the battery assembly was subjected to initial charging treatment by constant-current charging to 4.2 V at a rate of 1 C, pausing for 5 min, then constant-current discharging to 3.0 V at a rate of 1 C, and then pausing for 5 min. As a result, nonaqueous secondary batteries (theoretical capacity of 100 mAh, Examples 1 to 3 and Comparative Examples 1 to 4) were obtained. Next, the obtained nonaqueous secondary batteries were constant-current charged up to 4.1 V at a rate of C and then constant-current discharged to 3.0 V at a rate of 1 C, and the initial capacity was confirmed.

Measurement of Internal Resistance: The nonaqueous secondary batteries after the initial capacity confirmation

TABLE 2

| | | | | | | | | | | |
|---|---|---|---|---|---|---|---|---|---|---|
| | | | | | Nonaqueous Secondary Battery | | | | | |
| | | Separator | | Positive electrode | | Negative electrode | | Impedance | | |
| | | | | | Peel | | Peel | | | Reaction |
| | O/C ratio | Ra (μm) | Ra (μm) | Ra ratio | strength (N/m) | Ra (μm) | Ra ratio | strength (N/m) | DC resistance (Ω) | resistance (Ω) |
| Example 1 | 0.165 | 0.055 | 0.15 | 0.37 | 0.64 | 0.22 | 0.25 | 0.75 | 1.0 | 1.2 |
| Example 2 | 0.110 | | | | 0.54 | | | 0.58 | 1.0 | 1.1 |
| Example 3 | 0.195 | | | | 0.6 | | | 0.72 | — | — |
| Comparative Example 1 | 0.001 | 0.055 | 0.05 to 0.36 | 0.15 to 5.60 | 0 | 0.22 to 0.69 | 0.08 to 1.27 | 0 | 1.4 | 1.3 |
| Comparative Example 2 | 0.065 | 0.055 | | | 0.25 | | | 0.39 | 1.4 | 1.2 |
| Comparative Example 3 | 0.240 | 0.28 | | | 0 | | | 0 | 1.4 | 1.2 |
| Comparative Example 4 | 0.001 | 0.4*) | 0.15 | — | 0.83 | 0.22 | — | 1.05 | 1.2 | 2.9 |

Note)
Adhesive layer is formed instead of implementing surface reatment.

Figure 2:
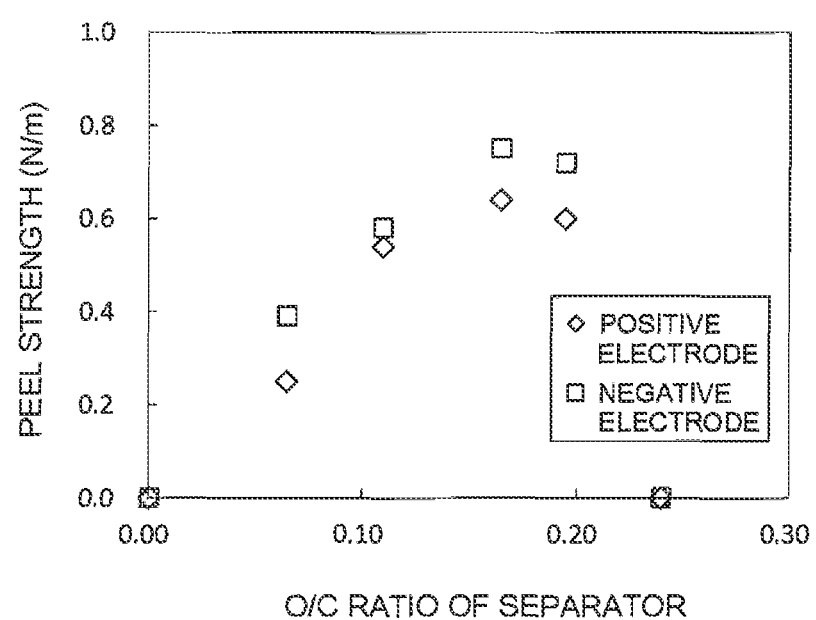
FIG. 2 is a graph showing the relationship between the O/C ratio of the separator and the peel strength.

FIG. 2 is a graph showing the relationship between the O/C ratio of the separator and the peel strength. As shown in Table 2 and FIG. 2, in Comparative Example 1 in which the separator was not subjected to plasma treatment and Comparative Example 2 in which the O/C ratio was relatively small even though the plasma treatment was performed, the peel strength with the electrode was low regardless of the degree of charge of the surface roughness Ra of the electrode. Further, in Comparative Example 3 in which the O/C ratio was relatively large, the peel strength was low regardless of the surface roughness Ra.

By contrast with Comparative Examples 1 to 3, in Examples 1 to 3 in which the O/C ratio of the separator was 0.1 to 0.2, the peel strength was 0.5 N/m or more and satisfactory adhesiveness was demonstrated. From the above results, it was found that with the technique disclosed herein, were adjusted to a SOC (state of charge) 50%, and the impedance was measured under an environment of room temperature (25° C.). The DC resistance and reaction resistance were calculated based on the obtained Cole-Cole plot. Here, the contact point with the X axis (Z') of the Cole-Cole plot, that is, the solution resistance ($R_{sol}$), was taken as "DC resistance". A charge transfer resistance ($R_{ct}$) obtained by subtracting the DC resistance ($R_{sol}$) from the inflection point ($R_{sol}+R_{ct}$) of the Cole-Cole plot was taken as "reaction resistance". The results are shown in Table 2.

As shown in Table 2, in Comparative Example 4 in which an adhesive layer was present on the surface of the separator, the reaction resistance was relatively high. The reason for this is apparently that the mobility of charge carriers is lowered as a result of covering the surfaces of the separator and the electrodes with the adhesive layer. In Comparative Examples 1 to 3 in which the peel strength between the electrode and the separator was small, the direct current resistance was relatively large. The reason for this is apparently that the distance between the positive and negative electrodes became relatively large because of poor adhesiveness between the electrode and the separator.

By contrast with Comparative Examples 1 to 4, in Examples 1 to 3 in which the positive electrode and the negative electrode each were bonded to the separator at a peel strength of 0.5 N/m or more without interposing the adhesive layer, the DC resistance and the reaction resistance were both kept small. The reason for this is apparently that the electrode and the separator were in an adhered state even after the battery was assembled, and the distance between the positive and negative electrode was small. In addition, it is conceivable that as a result of bonding the electrodes and the separator without interposing the adhesive layer, the surface of the separator or the electrode was not covered with the adhesive layer and the mobility of the charge carriers could be ensured.

Investigation II. Investigation of Surface Roughness Ra

Laminated electrode bodies were prepared in the same manner as in Investigation I-2 except that at least one of the surface roughness Ra of the separator, the surface roughness Ra of the positive electrode, and the surface roughness Ra of the negative electrode was changed as shown in Tables 3 and 4. Then, the peel strength was measured. Nonaqueous secondary batteries were constructed using the prepared electrode bodies in the same manner as in investigation I-2. Then, the internal resistance was measured. The results are shown in Tables 3 and 4. Note that "-" in the impedance column means that the impedance was not measured.

TABLE 3

| | Nonaqueous Secondary Battery | | | | | | | | |
|---|---|---|---|---|---|---|---|---|---|
| | Separator | | Positive electrode | | | Negative electrode | | | Impedance | |
| | O/C ratio | Ra (μm) | Ra (μm) | Ra ratio | Peel strength (N/m) | Ra (μm) | Ra ratio | Peel strength (N/m) | DC resistance (Ω) | Reaction resistance (Ω) |
| Example 1 | 0.165 | 0.055 | 0.15 | 0.37 | 0.64 | 0.22 | 0.25 | 0.75 | 1.0 | 1.2 |
| Example 4 | 0.165 | | | | | 0.36 | 0.15 | 0.59 | — | — |
| Example 5 | 0.165 | | | | | 0.5 | 0.11 | 0.56 | — | — |
| Example 6 | 0.165 | | 0.22 | 0.25 | 0.78 | 0.22 | 0.25 | 0.75 | — | — |
| Example 7 | 0.165 | | | | | 0.36 | 0.15 | 0.59 | — | — |
| Example 8 | 0.165 | | | | | 0.5 | 0.11 | 0.56 | — | — |
| Example 9 | 0.165 | | 0.36 | 0.15 | 0.51 | 0.22 | 0.25 | 0.75 | — | — |
| Example 10 | 0.165 | | | | | 0.36 | 0.15 | 0.59 | — | — |
| Example 11 | 0.165 | | | | | 0.5 | 0.11 | 0.56 | — | — |
| Example 12 | 0.165 | 0.065 | 0.15 | 0.44 | 0.55 | 0.22 | 0.3 | 0.87 | — | — |
| Example 13 | 0.165 | | | | | 0.36 | 0.18 | 0.6 | — | — |
| Example 14 | 0.165 | | | | | 0.5 | 0.13 | 0.59 | — | — |
| Example 15 | 0.165 | | 0.22 | 0.3 | 0.85 | 0.22 | 0.3 | 0.87 | — | — |
| Example 16 | 0.165 | | | | | 0.36 | 0.18 | 0.6 | — | — |
| Example 17 | 0.165 | | | | | 0.5 | 0.13 | 0.59 | — | — |
| Example 18 | 0.165 | | 0.36 | 0.18 | 0.55 | 0.22 | 0.3 | 0.87 | — | — |
| Example 19 | 0.165 | | | | | 0.36 | 0.18 | 0.6 | — | — |
| Example 20 | 0.165 | | | | | 0.5 | 0.13 | 0.59 | 1.0 | 1.1 |
| Example 21 | 0.165 | 0.072 | 0.15 | 0.48 | 0.53 | 0.22 | 0.33 | 0.89 | — | — |
| Example 22 | 0.165 | | | | | 0.36 | 0.2 | 0.7 | — | — |
| Example 23 | 0.165 | | | | | 0.5 | 0.14 | 0.58 | — | — |
| Example 24 | 0.165 | | | | | 0.69 | 0.1 | 0.53 | 1.0 | 1.2 |
| Example 25 | 0.165 | | 0.22 | 0.33 | 0.81 | 0.22 | 0.33 | 0.89 | — | — |
| Example 26 | 0.165 | | | | | 0.36 | 0.2 | 0.7 | — | — |
| Example 27 | 0.165 | | | | | 0.5 | 0.14 | 0.58 | — | — |
| Example 28 | 0.165 | | | | | 0.69 | 0.1 | 0.53 | — | — |
| Example 29 | 0.165 | | 0.36 | 0.2 | 0.58 | 0.22 | 0.33 | 0.89 | — | — |
| Example 30 | 0.165 | | | | | 0.36 | 6.2 | 0.7 | — | — |
| Example 31 | 0.165 | | | | | 0.5 | 0.14 | 0.58 | — | — |
| Example 32 | 0.165 | | | | | 0.69 | 0.1 | 0.53 | — | — |

TABLE 4

| | Nonaqueous Secondary Battery | | | | | | | | |
|---|---|---|---|---|---|---|---|---|---|
| | Separator | | Positive electrode | | | Negative electrode | | | Impedance | |
| | O/C ratio | Ra (μm) | Ra (μm) | Ra ratio | Peel strength (N/m) | Ra (μm) | Ra ratio | Peel strength (N/m) | DC resistance (Ω) | Reaction resistance (Ω) |
| Example 33 | 0.165 | 0.055 | 0.05 | 1.1 | 0.31 | 0.22 | 0.25 | 0.75 | 1.2 | 1.1 |
| Example 34 | 0.165 | | 0.05 | 1.1 | 0.31 | 0.36 | 0.15 | 0.59 | — | — |
| Example 35 | 0.165 | | 0.05 | 1.1 | 0.31 | 0.5 | 0.11 | 0.56 | — | — |
| Example 36 | 0.165 | | 0.05 | 1.1 | 0.31 | 0.69 | 0.08 | 0.41 | 1.4 | 1.3 |

TABLE 4-continued

Nonaqueous Secondary Battery

| | Separator | | Positive electrode | | | Negative electrode | | | Impedance | |
|---|---|---|---|---|---|---|---|---|---|---|
| | O/C ratio | Ra (μm) | Ra (μm) | Ra ratio | Peel strength (N/m) | Ra (μm) | Ra ratio | Peel strength (N/m) | DC resistance (Ω) | Reaction resistance (Ω) |
| Example 37 | 0.165 | | 0.15 | 0.37 | 0.64 | 0.69 | 0.08 | 0.41 | 1.2 | 1.2 |
| Example 38 | 0.165 | | 0.22 | 0.25 | 0.78 | 0.69 | 0.08 | 0.41 | — | — |
| Example 39 | 0.165 | | 0.36 | 0.15 | 0.51 | 0.69 | 0.08 | 0.41 | 1.2 | 1.2 |
| Example 40 | 0.165 | 0.065 | 0.05 | 1.31 | 0.24 | 0.22 | 0.3 | 0.87 | — | — |
| Example 41 | 0.165 | | 0.05 | 1.31 | 0.24 | 0.36 | 0.18 | 0.6 | — | — |
| Example 42 | 0.165 | | 0.05 | 1.31 | 0.24 | 0.5 | 0.13 | 0.59 | — | — |
| Example 43 | 0.165 | | 0.05 | 1.31 | 0.24 | 0.69 | 0.09 | 0.44 | — | — |
| Example 44 | 0.165 | | 0.15 | 0.44 | 0.55 | 0.69 | 0.09 | 0.44 | 1.2 | 1.3 |
| Example 45 | 0.165 | | 0.22 | 0.3 | 0.85 | 0.69 | 0.09 | 0.44 | — | — |
| Example 46 | 0.165 | | 0.36 | 0.18 | 0.55 | 0.69 | 0.09 | 0.44 | — | — |
| Example 47 | 0.165 | 0.072 | 0.05 | 1.45 | 0.23 | 0.22 | 0.33 | 0.89 | — | — |
| Example 48 | 0.165 | | 0.05 | 1.45 | 0.23 | 0.36 | 0.2 | 0.7 | — | — |
| Example 49 | 0.165 | | 0.05 | 1.45 | 0.23 | 0.5 | 0.14 | 0.58 | — | — |
| Example 50 | 0.165 | | 0.05 | 1.45 | 0.23 | 0.69 | 0.1 | 0.53 | — | — |
| Example 51 | 0.165 | 0.21 | 0.05 | 4.2 | 0 | 0.22 | 0.95 | 0.23 | — | — |
| Example 52 | 0.165 | | 0.05 | 4.2 | 0 | 0.36 | 0.58 | 0.44 | — | — |
| Example 53 | 0.165 | | 0.05 | 4.2 | 0 | 0.5 | 0.42 | 0.75 | — | — |
| Example 54 | 0.165 | | 0.05 | 4.2 | 0 | 0.69 | 0.3 | 0.87 | — | — |
| Example 55 | 0.165 | | 0.15 | 1.4 | 0.21 | 0.22 | 0.95 | 0.23 | — | — |
| Example 56 | 0.165 | | 0.15 | 1.4 | 0.21 | 0.36 | 0.58 | 0.44 | — | — |
| Example 57 | 0.165 | | 0.15 | 1.4 | 0.21 | 0.5 | 0.42 | 0.75 | — | — |
| Example 58 | 0.165 | | 0.15 | 1.4 | 0.21 | 0.69 | 0.3 | 0.87 | — | — |
| Example 59 | 0.165 | | 0.22 | 0.95 | 0.34 | 0.22 | 0.95 | 0.23 | — | — |
| Example 60 | 0.165 | | 0.22 | 0.95 | 0.34 | 0.36 | 0.58 | 0.44 | — | — |
| Example 61 | 0.165 | | 0.22 | 0.95 | 0.34 | 0.5 | 0.42 | 0.75 | — | — |
| Example 62 | 0.165 | | 0.22 | 0.95 | 0.34 | 0.69 | 0.3 | 0.87 | — | — |
| Example 63 | 0.165 | | 0.36 | 0.58 | 0.45 | 0.22 | 0.95 | 0.23 | — | — |
| Example 64 | 0.165 | | 0.36 | 0.58 | 0.45 | 0.36 | 0.58 | 0.44 | 1.4 | 1.1 |
| Example 65 | 0.165 | | 0.36 | 0.58 | 0.45 | 0.5 | 0.42 | 0.75 | — | — |
| Example 66 | 0.165 | | 0.36 | 0.58 | 0.45 | 0.69 | 0.3 | 0.87 | 1.2 | 1.3 |
| Example 67 | 0.165 | 0.28 | 0.05 | 5.6 | 0 | 0.22 | 1.27 | 0.12 | — | — |
| Example 68 | 0.165 | | 0.05 | 5.6 | 0 | 0.36 | 0.78 | 0.39 | — | — |
| Example 69 | 0.165 | | 0.05 | 5.6 | 0 | 0.5 | 0.56 | 0.42 | — | — |
| Example 70 | 0.165 | | 0.05 | 5.6 | 0 | 0.69 | 0.41 | 0.75 | — | — |
| Example 71 | 0.165 | | 0.15 | 1.87 | 0.18 | 0.22 | 1.27 | 0.12 | — | — |
| Example 72 | 0.165 | | 0.15 | 1.87 | 0.18 | 0.36 | 0.78 | 0.39 | — | — |
| Example 73 | 0.165 | | 0.15 | 1.87 | 0.18 | 0.5 | 0.56 | 0.42 | — | — |
| Example 74 | 0.165 | | 0.15 | 1.87 | 0.18 | 0.69 | 0.41 | 0.75 | — | — |
| Example 75 | 0.165 | | 0.22 | 1.27 | 0.31 | 0.22 | 1.27 | 0.12 | — | — |
| Example 76 | 0.165 | | 0.22 | 1.27 | 0.31 | 0.36 | 0.78 | 0.39 | — | — |
| Example 77 | 0.165 | | 0.22 | 1.27 | 0.31 | 0.5 | 0.56 | 0.42 | — | — |
| Example 78 | 0.165 | | 0.22 | 1.27 | 0.31 | 0.69 | 0.41 | 0.75 | — | — |
| Example 79 | 0.165 | | 0.36 | 0.78 | 0.4 | 0.22 | 1.27 | 0.12 | — | — |
| Example 80 | 0.165 | | 0.36 | 0.78 | 0.4 | 0.36 | 0.78 | 0.39 | — | — |
| Example 81 | 0.165 | | 0.36 | 0.78 | 0.4 | 0.5 | 0.56 | 0.42 | 1.4 | 1.2 |
| Example 82 | 0.165 | | 0.36 | 0.78 | 0.4 | 0.69 | 0.41 | 0.75 | 1.2 | 1.3 |

Figure 3:
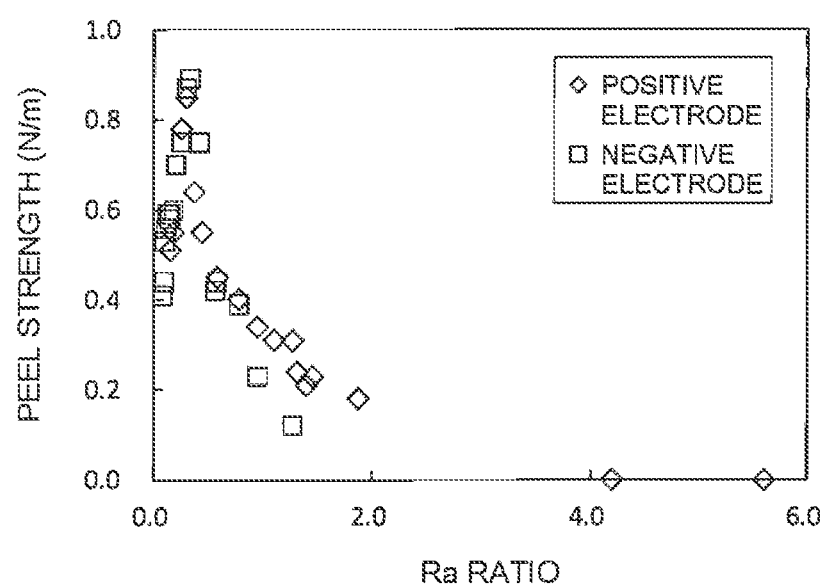
FIG. 3 is a graph showing the relationship between the Ra ratio and the peel strength.
Figure 4:
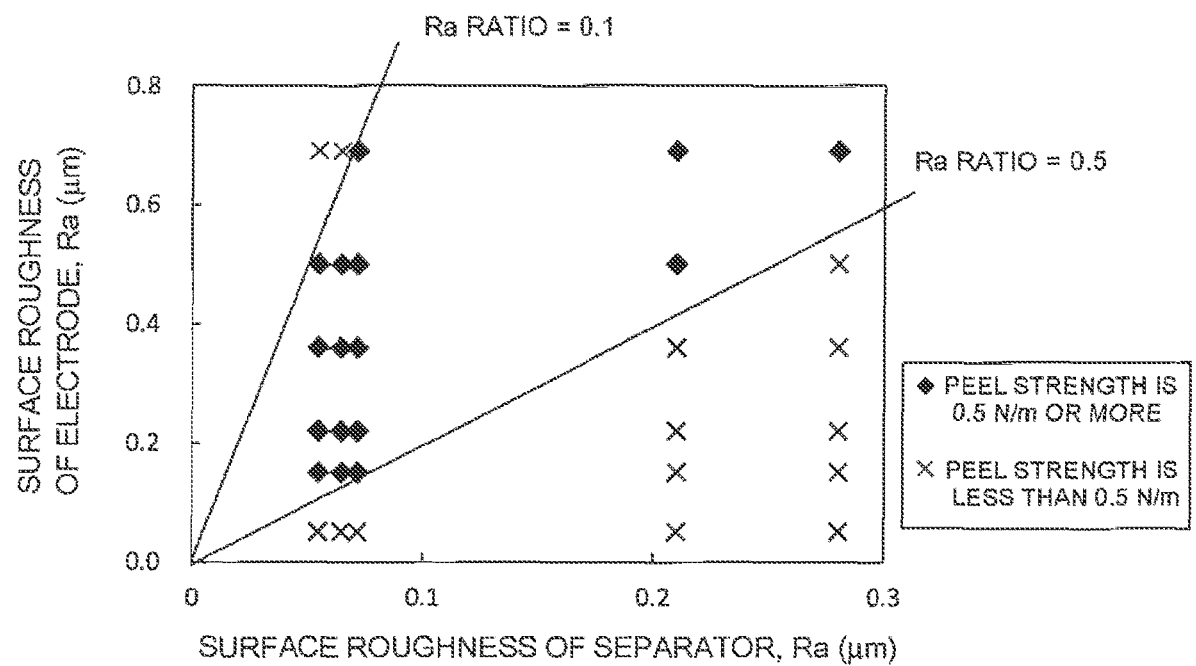
FIG. 4 is a graph showing the relationship between the surface roughness Ra of the separator and the surface roughness Ra of the electrode.

FIG. 3 is a graph showing the relationship between the Ra ratio and the peel strength for Examples 33 to 82. FIG. 4 is a graph showing the relationship between the surface roughness Ra of the separator and the surface roughness Ra of the electrode in Examples 1 to 82. As shown in Tables 3 and 4 and FIGS. 3 and 4, when the Ra ratio was less than 0.1 or more than 0.5, the peel strength between the electrode and the separator became less than 0.5 N/m and the adhesiveness was low. The reason for this is apparently that the contact area between the separator and the electrode was reduced. Further, similarly to Comparative Examples 1 to 4, in the examples in which the peel strength between the electrode and the separator was less than 0.5 N/m, as in Examples 36, 64, and 84, the internal resistance (DC resistance and/or reaction resistance) was large. Moreover, the internal resistance was further reduced.

By contrast with the Comparative Examples, when the electrode (positive electrode or negative electrode) and the separator satisfied all of the following conditions: (1) the electrode and the separator are in contact with each other; (2) the O/C ratio of the separator is 0.1 to 0.2; (3) the surface roughness Ra of the separator is 0.05 μm to 0.3 μm; and (4) the ratio of the surface roughness Ra of the separator to the surface roughness Ra of the electrode is 0.1 to 0.5, the peel strength between the electrode and the separator was 0.5 N/m or more, and the electrode and the separator were satisfactorily bonded to each other.

In such an electrode body, the integrity of the electrode and the separator was high, and the handleability at the time of assembling the battery was satisfactory. In addition, the internal resistance of such an electrode body was suppressed to be lower than that in, for example, Comparative Examples 1 to 4. Among the examples, in Examples 1 and 4 to 32 (Table 3) in which both the positive electrode and the separator, and the negative electrode and the separator satisfied the above conditions (1) to (4), the whole electrode body (positive electrode, separator and negative electrode) was physically integrated, and the handleability of the electrode body at the time of assembling the battery was much better than in the following groups (a) and (b) of Examples: (a) Examples 33 to 36, 40 to 43, 47 to 50, 53, 54, 57, 58, 61, 62, 65, 66, 70, 72, 78, and 82 in which the positive electrode and the separator did not satisfy the above conditions (1) to (4) and only the negative electrode and the separator satisfied the above conditions (1) to (4), and (b) Examples 37 to 39 and 44 to 46 in which the negative electrode and the separator did not satisfy the above conditions (1) to (4) and only the positive electrode and the separator satisfied the above conditions (1) to (4). These results indicate the significance of the technique disclosed herein.

Although some embodiments have been described in detail, the above embodiments and examples are merely exemplary, and the disclosure is inclusive of various changes and modifications of the above-described specific examples.

The terms and expressions used herein are for description only and are not to be interpreted in a limited sense. These terms and expressions should be recognized as not excluding any equivalents to the elements shown and described herein and as allowing any modification encompassed in the scope of the claims. The embodiments disclosed herein may be embodied in many various forms. This disclosure should be regarded as providing embodiments of the principles described herein. These embodiments are provided with the understanding that they are not intended to limit the claimed subject matter to the embodiments described in the specification and/or shown in the drawings. The claimed subject matter is not limited to the embodiments described herein. The claimed subject matter encompasses any of the embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the embodiments described in this specification or used during the prosecution of the present application.

What is claimed is:

1. A nonaqueous secondary battery comprising:
    an electrode body including a positive electrode, a negative electrode, and a separator interposed between the positive electrode and the negative electrode, wherein at least one surface of the separator is modified to comprise at least one hydrophilic group, and
    a nonaqueous electrolyte,
    wherein a surface of the separator on the side facing at least one electrode of the positive electrode and the negative electrode has an O/C ratio of 0.1 or more and 0.2 or less, which is calculated by the following formula: O/C ratio=area of O1s peak measured by X-ray photoelectron spectroscopy/area of C1s peak measured by X-ray photoelectron spectroscopy.

2. The nonaqueous secondary battery according to claim 1, wherein the electrode has the surface roughness Ra of 0.1 μm or more and 0.7 μm or less on the surface on the side facing the separator.

3. The nonaqueous secondary battery according to claim 1, wherein the electrode body is configured by alternately and repeatedly laminating a plurality of positive electrodes of a rectangular shape and a plurality of negative electrodes of a rectangular shape, with a plurality of the separators of a rectangular shape being interposed therebetween.

4. The nonaqueous secondary battery according to claim 1, wherein a 90° peel strength between the electrode and the separator is 0.6 N/m or more.

5. The nonaqueous secondary battery according to claim 1, wherein at least one electrode of the positive electrode and the negative electrode and the separator satisfy any of conditions (1) to (3) below:
    (1) the electrode and the separator are in contact with each other;
    (2) a surface roughness Ra of the surface of the separator on the side facing the electrode is 0.05 μm or more and 0.3 μm or less; and
    (3) a ratio of the surface roughness Ra of the separator to the surface roughness Ra of the electrode is 0.1 or more and 0.5 or less.

6. The nonaqueous secondary battery according to claim 5, wherein:
    the surface of the separator on the side facing the positive electrode has an O/C ratio of 0.1 or more and 0.2 or less, which is calculated by the following formula: O/C ratio=area of O1s peak measured by X-ray photoelectron spectroscopy/area of C1s peak measured by X-ray photoelectron spectroscopy; and
    the surface of the separator on the side facing the negative electrode has an O/C ratio of 0.1 or more and 0.2 or less, which is calculated by the following formula: O/C ratio=area of O1s peak measured by X-ray photoelectron spectroscopy/area of C1s peak measured by X-ray photoelectron spectroscopy.

7. The nonaqueous secondary battery according to claim 6, wherein the positive electrode and the separator satisfy all of the conditions (1) to (3), and the negative electrode and the separator satisfy all of the conditions (1) to (3).

* * * * *

UNITED STATES PATENT AND TRADEMARK OFFICE
CERTIFICATE OF CORRECTION

PATENT NO. : 10,777,798 B2
APPLICATION NO. : 16/180600
DATED : September 15, 2020
INVENTOR(S) : Natsumi Hiramoto It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

In the Specification

In Column 5, Line(s) 39, delete "0.5 μm" and insert --0.15 μm--, therefor.

In Column 12, Line(s) 25, before "and", delete "C" and insert --1 C--, therefor.

Signed and Sealed this
Twelfth Day of January, 2021

Andrei Iancu
*Director of the United States Patent and Trademark Office*